Oct. 15, 1968   J. M. KILPATRICK   3,406,101
METHOD AND APPARATUS FOR DETERMINING CORROSION RATE
Filed Dec. 23, 1963                                2 Sheets-Sheet 1
FIG. 1
CATHODIC POLARIZATION CURVE
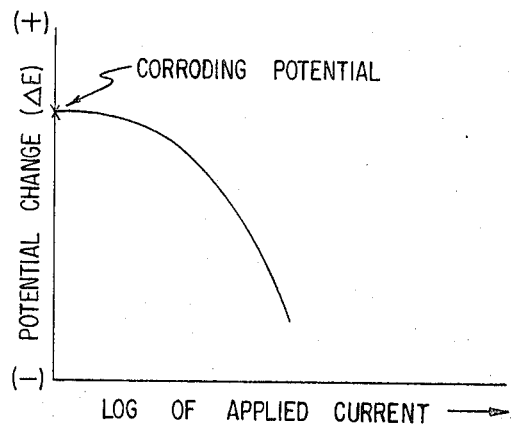
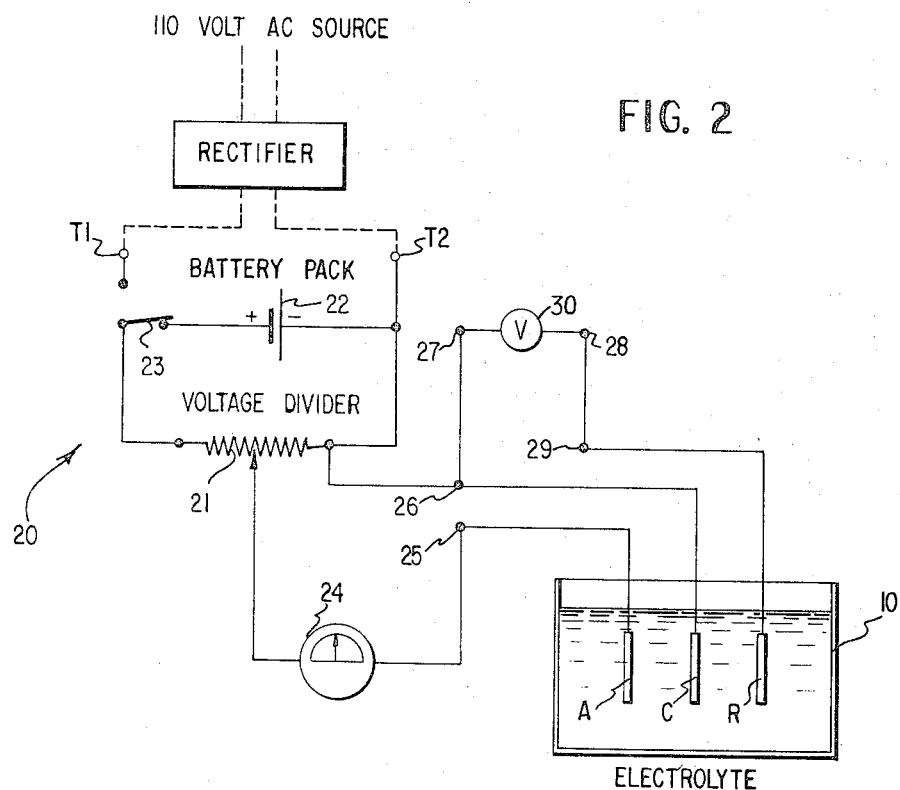
INVENTOR.
J. M. KILPATRICK
BY
McLean and Boustead
ATTORNEYS.

FIG. 3A
FIG. 3B
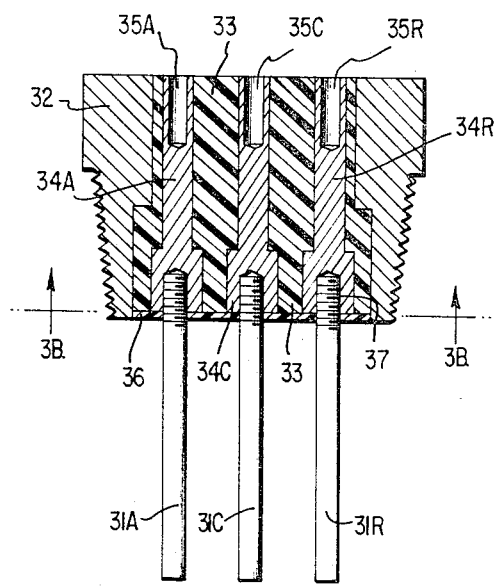
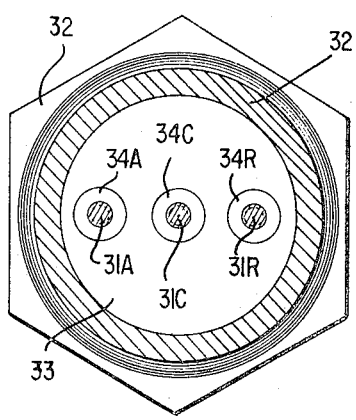
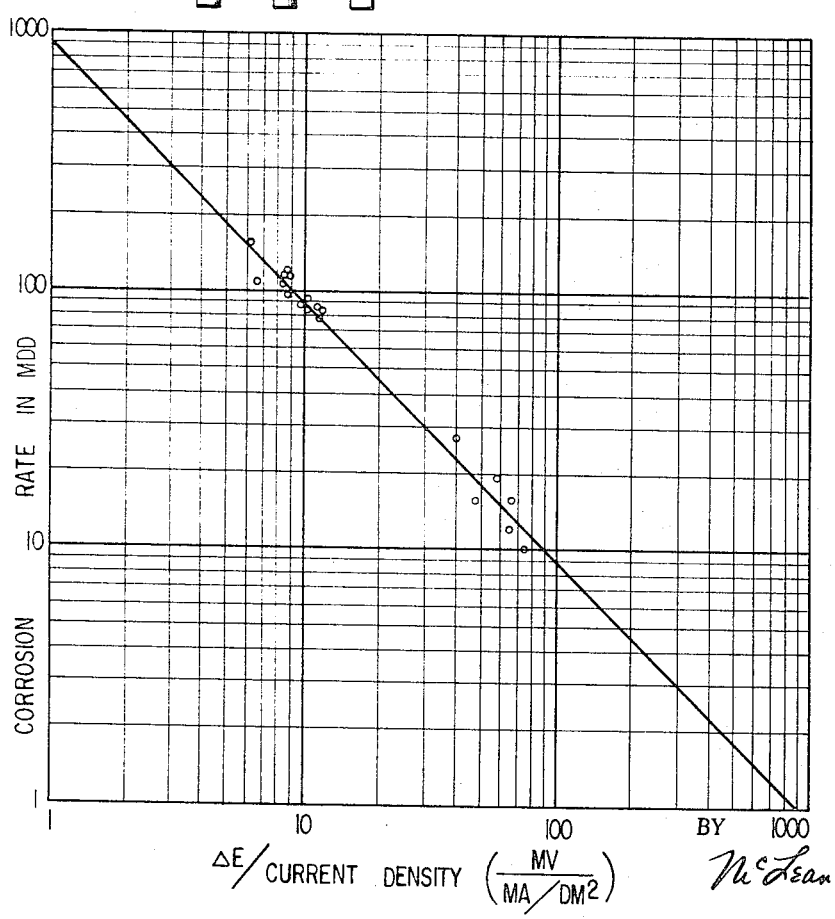
FIG. 4
CORRELATION OF POLARIZATION AND WEIGHT LOSS DATA
INVENTOR.
J. M. KILPATRICK

United States Patent Office 3,406,101
Patented Oct. 15, 1968

3,406,101
METHOD AND APPARATUS FOR DETERMINING CORROSION RATE
James M. Kilpatrick, Tulsa, Okla., assignor, by mesne assignments, to Petrolite Corporation, Webster Grove, Mo., a corporation of Delaware
Filed Dec. 23, 1963, Ser. No. 332,399
20 Claims. (Cl. 204—1)

ABSTRACT OF THE DISCLOSURE

Apparatus and process for rapidly determining the corrosion rate of metallic constructional material exposed to a corrodant electrolyte, for example, an oil field brine, by means of polarization measurements in the electrolytic environment, said apparatus comprising test probe means including three electrodes consisting of a test specimen, a reference electrode and a third electrode, said test specimen and said reference electrode being substantially dimensionally identical and being formed of said metallic material, for example, steel, said test probe means being adapted for immersion in said corrodant electrolyte, means for passing a measurable amount of a polarizing current through the third electrode and the test specimen in an amount sufficient for polarizing said test specimen, said means for passing said measurable amount of polarizing current including a source of direct current, a circuit connecting said third electrode and said test specimen to said direct current source, means in said connecting circuit across said direct current source for accurately controlling the current supplied to the third electrode, for example, a voltage divider, means in said circuit for measuring the current, for example, a calibrated ammeter, and means arranged in an external circuit between the test specimen and the reference electrode for metering said predetermined amount of polarization of the test specimen with respect to the reference electrode. The process comprises immersing said three electrodes in the corrodant electrolyte, one electrode as the anode, another electrode as the cathode and the third electrode as the reference electrode, each of said electrodes having a predetermined exposed area, passing a measurable amount of direct current through the anode, corrodant electrolyte and cathode in an amount sufficient to effect a predeterminable measurable polarization of said one of said anode and said cathode with respect to said reference electrode, detecting electrically and metering the current density with respect to corrosion rate weight loss of the electrode required to obtain said predetermined polarization to produce a composite corrosion rate-polarization resistance curve whereby the corrosion rate of an electrode of said metal in contact with an electrolytic environment similar to said corrodant electrolyte can be correlated with aspects of the curve and determined by electrically measuring the current density required for an electrode of said metal and said predetermined surface area to obtain said predetermined polarization when immersed in said electrolytic environment.

---

This invention relates to the use of an electrochemical technique in the study of corrosion processes. It is more specifically concerned with correlating the polarization characteristics of metals with the corrosion rate of said metals and with the design of compact and simple apparatus adapted to permit an easy and rapid determination of the rates at which said metals are corroding in electrolytic solutions by means of polarization measurements.

The many complex and heterogeneous variables which may be involved in corrosion reactions make the investigation of corrosion problems very difficult. Although various attempts have been made to simulate corrosive environments and study the effect of these environments under conditions in which the rates of corrosion reactions would be accelerated by increasing the intensity of the variables involved, as a general rule, the results of these tests do not correlate very readily with actual field data. As a result, the time honored technique of exposing various metallic materials of construction to actual conditions under which the metals are to be used has provided information upon which the most reliance may be placed. This technique has obvious disadvantages, such as the relatively long periods of time required to obtain sufficient information and the limitations in the technique due to the inability to vary slightly the environmental conditions under which the metallic materials of construction are to be employed. The most desirable technique would be an accelerated process which could be carried out either in the laboratory or in the field by using simple apparatus and provide sufficient and reliable information upon which the solution to engineering problems, occurring due to corrosion, could be predicated. In searching for time-saving techniques, investigators have taken advantage of the electrochemical nature of the corrosion mechanism. The polarization phenomenon has been one electrochemical mechanism upon which investigators have dwelled in an effort to find a satisfactory rapid technique which may be used in corrosion studies. A number of techniques using this phenomenon have been discolsed in the prior art, e.g., see U.S. Patent 2,786,021 and U.S. Patent 2,796,583. Most such methods, however, are not generally applicable because they are based upon considerations which are not common to various corrosion systems. Continued study of this technique has resulted in an improved apparatus which further facilitates the rapid study of corrosion rate.

It is therefore an object of this invention to provide an accelerated method for quantitatively determining the effect of electrochemical corrosion by means of a rapid technique which provides reproducible results. It is a further object of this invention to correlate quantitatively the effect of electrochemical polarization with corrosion rate. Another object of this invention is to proivde an apparatus which may be employed in carrying out investigations of the corrosion rate of metallic materials of construction exposed to electrolytic corrosive environments. It is another object of this invention to provide a portable instrument which may be employed to rapidly and directly determine the corrosion rate of metallic materials of construction either under controlled laboratory conditions or under actual corrosion conditions occurring in the field. These and other objects will become more apparent from the following detailed discussion of the instant invention.

FIGURE 1 is a graphical representation of a typical cathode polarization curve;

FIGURE 2 is a simplified representation of the instrument which may be used in carrying out the present invention;

FIGURE 3A is a cross-sectional view of a corrosion test probe illustrating the three electrode arrangement of the present invention and FIGURE 3B is a plan view of the bottom of the probe in accordance with FIGURE 3A; and FIGURE 4 is a graphical representation of the correlation of polarization and weight loss data plotted on logarithmic scales.

It is well known that corrosion of metals occurs by either direct chemical action or electrochemical action between the metals and their environment. Whereas the first type of corrosion is effected by direct chemical attack and does not require the presence of moisture, the second type of corrosion requires the presence of moisture in the corrosive environment to produce a galvanic process. In this type of corrosion there is consumed chemical energy with the production of electrical energy. It therefore should be apparent that a knowledge of the electrochemical characteristics of corrosion cells would be useful in obtaining information as to the corrosibility of various substances. The prior art does disclose the use of electrochemical techniques as a means for predicting corrosion behavior and in general these techniques have used, as a criterion, the polarization characteristics of metallic materials of construction.

Polarization has been defined as the stoppage of the voltaic current from an electrolytic cell due to the accumulation of dissociation products at the electrodes and it is a measure of the irreversibility of an electrolytic process. Polarization may be observed by measuring the potential of an electrode as referred to a reference electrode while current is passing through the electrode with the electrode immersed in an electrolyte. The products formed at the electrode surface cause the electrode potential to change. If the electrode potential changes during the polarization in a negative direction, the polarization is cathodic. Similarly if the electrode potential changes in a positive direction, the polarization is anodic. Removal of the polarization products by either dissolving or diffusing away causes the electrode to be depolarized and the electrode potential returns to its normal electrode potential. The term "normal potential" is intended to designate the non-thermodynamic or steady-state potential of the metal in the corroding environment.

Polarization of a metal specimen corroding in an electrolytic solution is accomplished by impressing direct current from an external source onto the metal and noting the amount of change in its electrical potential with respect to the surrounding electrolyte. Both anodic and cathodic polarization are obtained in this manner. In cathodic polarization, controlled increments of positive current from a DC power supply are passed through the electrolyte by means of an impressed current anode where they are received by the metal specimen and returned through an external circuit to the power supply. The potential changes from the steady state or normal corroding potential are taken in respect to a suitable reference electrode placed in the electrolyte near the metal test specimen. By plotting these potential changes ($\Delta E$) against the applied current increments ($\Delta I$) on a semilogarithmic scale, a cathodic polarization curve is obtained. A typical cathodic polarization curve is shown in FIGURE 1.

E. J. Simmons, Corrosion, vol. 11, pp. 225t–260t (1955) and R. V. Skold and T. E. Larson, Corrosion, vol. 13, pp. 139t–142t (1957) noted that the initial portion of a polarization curve for a corroding metal was linear and that the slope ($\Delta E/\Delta I$, or polarization resistance) of this linear portion of the curve appeared to be inversely proportional to the rate at which the metal was corroding. Although Simmons observed this relationship, he made no attempt to relate it with quantitative measurements of corrosion rates. Using essentially fresh waters, specific resistances of about 3000 ohm-cm., Skold and Larson empirically correlated these measurements with metal weight loss and found an apparent logarithmic relationship between weight loss and $\Delta E/\Delta I$ values.

This work was analyzed by M. Stern, Corrosion, vol. 14, pp. 440t–444t (1958) and found to be theoretically sound. Stern stated that the linear extent of a polarization curve can be expected for only about the first 10 millivolts of polarization and that the relationship does not exist at potential values far removed from the steady state corroding potential. He also pointed out that if the corrosion rate is inversely proportional to polarization resistance, then a plot of these two values on logarithmic scales should give a straight line with a slope of minus one. Skold and Larson's data gave a slope greater than this. This error was apparently due to IR drop resulting from current passing through the highly resistant soultions. This IR drop would be included in the potential measurements, thereby resulting in larger values of $\Delta E/\Delta I$. Stern predicted that in low resistance solutions most of this error should be eliminated.

Based on the above observations, the polarization resistance technique showed great promise as a tool for measuring corrosion in electrolytic media, especially corrosion associated with natural waters encountered in the petroleum industry. However, before the technique could be used for this type of work, additional work was necessary to provide an empirical determination of the effects of different solution resistivities, e.g. those found in oil field brines, on $\Delta E/\Delta I$ versus weight-loss correlations. Also the development of portable equipment, including a test probe suitable for measurements under field conditions, was necessary. Development of this equipment was made possible by the design of a new and improved test probe including a reference electrode capable of accurately detecting small potential changes while exposed to adverse environmental conditions, e.g. high pressures and temperatures, the presence of crude oil, and acidic gases such as hydrogen sulfide and carbon dioxide which are dissolved in some natural brines. Development of the test probe including the reference electrode capable of performing properly under these conditions permitted construction of the compact corrosion test probe and instrument of the present invention which can be easily used in the field since the probe can be inserted directly into the system to be measured.

Recently, G. A. Marsh "The Measurement of Instantaneous Corrosion Rates," Second International Congress on Metallic Corrosion, 29 pages (1963) developed an instrument which utilizes a modification of the polarization resistance technique to measure instantaneous corrosion rates. Marsh measures potential changes between two similar electrodes as current is applied between them. Current is impressed until 20 millivolts potential difference exists between the two electrodes (the equivalent of 10 millivolts on each electrode), then the current direction is reversed and the process repeated. The average of the two current values is taken as the amount of applied current necessary for 10 millivolts of polarization. Although this technique eliminated the need for a reference electrode, it introduces considerable IR drop into the potential measurements. This results mainly from the potential being measured in the current circuit. This IR drop factor must be measured and a correction applied to each solution being tested.

In general, the corrosion measuring device of the present invention consists of a corrosion test probe having a three electrode arrangement and a portable, battery-operated instrument, generally designated in FIGURE 2 by reference numeral 20, which supplies the direct current needed to polarize the test electrode or specimen to the desired level and which reads the change in potential. The three electrode arrangement of the test probe, which is schematically illustrated in FIGURE 2, includes an anode A, a cathode or test specimen C and a reference electrode R. The three electrodes are machined within close tolerances to the same specifications in the preferred embodiment so as to be similar and interchangeable as described more fully hereinafter. This facilitates ease in their construction and also prevents the possibility of installing the wrong electrode as the test specimen when the elements are replaced.

The electrodes A, C, and R are immersed in the solution being tested which is contained in a suitable receptacle 10. The receptacle 10 may be simply a glass beaker wherein corrosion rate is being studied under controlled laboratory conditions, or may be a conduit or vessel forming a part of a process which contains a corrosive, electrically conductive environment. The arrangement of the present invention has particular application for use in testing the corrosion of metallic conduits employed in oil, gas, or water wells, as well as the metallic flow lines and surface equipment appurtenant to these wells. By means of electrodes, for example, through use of a test probe as illustrated in FIGURE 3A, it is possible to determine the effectiveness of corrosion inhibitors employed to retard the corrosion in these metallic containers.

The instrument 20 of FIGURE 2 for supplying direct current to the test probe is arranged for cathodic polarization. If desired, however, the instrument may be designed for anodic polarization by suitable rearrangement. When anodic polarization is desired, the anode, now the test specimen, is preferably placed near the reference electrode. The instrument 20 comprises a current supply circuit including a voltage divider 21 connected across a dry cell arrangement 22, e.g. a 3 v. battery pack, to permit accurate current settings in the microampere range. Electrical outlets 25 and 26 of the current supply circuit provide means for rapid and easy connection of the anode A and cathode C of the test probe into the circuit. The supply circuit is operated by switch 23 and includes the electrolyte or conductive fluid, the corrosive characteristics of which are being determined. The instrument may also be operated from rectified 110 AC line voltage connected across terminals T1 and T2 provided in the current supply circuit, if desired. The circuit through terminals T1 and T2 is also conveniently controlled by switch 23, as shown. Rectified line voltage is preferable when the instrument is used in the laboratory and a portable instrument is not desired.

The current supply circuit also includes a variable range microammeter 24, e.g. 0–5 μa., 0–200 μa., 0–500 μa., 0–1000 μa., which is connected in series between the voltage divider and outlet 25 to provide for reading of the current settings.

A high impedance voltmeter 30 is also provided with instrument 20. The voltmeter 30 and instrument 20 may be conveniently housed in a single instrument package or used as separate units, as desired. Voltmeter 30 is connected in an external, or potential measuring, circuit across outlets 27 and 28 which are connected, respectively, to outlets 26 and 29. The electrolyte completes the external or potential measuring circuit through the cathode or test specimen C, reference electrode R and voltmeter 30. A high impedance voltmeter having an input impedance of at least $10^6$ ohms and capable of reading accurately to 0.1 of a millivolt is used. By using a high impedance voltmeter, current flow through the potential measuring circuit is greatly limited, e.g. to approximately $10^{-8}$ amps. This virtually eliminates any polarization of the reference electrode while measurements are being made.

A preferred construction of the corrosion test probe used with the instrument 20 of FIGURE 2 is shown in FIGURES 3A and 3B. This test probe consists of three steel electrodes 31A, 31C, 31R, each mounted by threads 37 in a standard hexagonal head pipe plug 32. Electrode 31A is the impressed anode; electrode 31C is the cathode or test specimen; and, electrode 31R is the reference electrode. The electrodes are insulated from each other and the plug 32 by means of an insert 33 made from an insulating material, e.g. rubber or a synthetic material such as synthane (a laminated phenolic material), plastic, etc. Three inserts 34A, 34C, 34R, of conductive material, e.g. steel, are contained within the insulating insert 33 to establish electrical contact between the electrodes 31A, 31C, and 31R, respectively, and the supply and external circuits of the instrument 20 (see FIGURE 2) described above.

The conducting inserts 34A, 34C and 34R may be attached to electrical outlets 25, 26 and 29, respectively, by electrical leads (not shown) inserted in female receptacles 35A, 35C and 35R, respectively. The size of the pipe plug 32 and geometric arrangement of the electrodes may obviously be modified as desired. A two-inch plug was used in the construction of the test probe described because this is the most common size encountered in oil field equipment. The linear arrangement of the electrodes was also chosen for simplicity. Another arrangement which may be used is a triangular spacing of the electrodes. It is, however, desirable that the reference electrode and test specimen be relatively close to each other, so that each experience the same conditions of temperature, concentration of solution, etc., and to reduce the IR drop included in the potential measurements. A cover 36, e.g. of Teflon, serves to keep the electrolyte from contacting the inserts 34A, 34C, and 34R. If the electrolyte were to contact these inserts, the amount of exposed metal surface would be changed, and accordingly, all measurements, since the exposed surface area would not be a constant. In the arrangement of the present invention the exposed surface area must remain constant, to give accurate and easy readings since, as stated previously, corrosion rates are inversely proportional to polarization resistance ($\Delta E/\Delta I$), where $\Delta I$ is actually in units of current density of ($\Delta I$/area). If $\Delta E$ and the exposed surface area of the test specimens are fixed as constants, the corrosion rates become directly proportional to the applied current.

The three electrodes 31 are each of identical construction and made from steel. Preferably, the electrodes are one-quarter-inch in diameter, 1020 mild steel rods, machined to give an apparent exposed surface area of 9.0 square centimeters or 0.090 of a square decimeter since it has been determined, using solutions containing a wide range of salt concentrations, that a steel electrode with 0.090 of a square decimeter exposed to the solution and corroding at a rate of 1 mdd (milligrams per square decimeter per day) requires an average of 1 microamp of external current to obtain 10 millivolts of polarization. This permits the microammeter in the instrument 20 to be calibrated directly in mdd, a common unit used to describe corrosion rates. Of course, if desired, electrodes of other sizes and shapes may be used.

Although steel has been proved suitable for use as a reference electrode in the corrosion test probe of the present invention, the theory of the technique indicates that other metals and metal alloys, e.g. copper, brass, lead, nickel, etc., may be used under similar conditions. The use of a separate steel reference electrode, especially when the cathode is steel, is advantageous, however, in that it permits a short test period, and permits use of high temperatures and pressure. Also, the difficulties normally encountered when taking potential measurements with a metal reference electrode are eliminated by using a test specimen and reference electrode of the same material regardless of the metal used. Neither the anode nor reference electrode need to be made of steel, or even of the metallic material required for the test electrode but merely need to be conductive. The test electrode must be of a metallic material having polarization characteristics suitable for measuring corrosion.

Using the above-described instrument and test probe, the polarization measurements in accordance with the present invention are made in the following manner. The corrosion test probe, with new electrodes 31 in place, is installed in the solution to be tested. The electrodes 31 must be completely immersed in the solution to provide a constant, known exposed surface area for accurate readings. The current supply instrument 20 is then connected with electrodes 31A and 31C to complete the external circuit between electrodes 31A and 31C. This is accomplished by inserting electrical leads from outlets 25 and 26 of the instrument 20 into the female receptacles 35A and 35C provided in the top of the inserts 34 of the probe. Voltmeter 30 is then placed in the external circuit between electrodes 31C and 31R. The positive terminal of the voltmeter is connected to the reference electrode 31R. Then switch 23 is closed to turn the current supply on and the current is set at zero. The potential between electrodes 31C and 31R is read through voltmeter 30 with the current set at zero and recorded. This is the steady state or normal corroding potential of test electrode 31C with respect to reference electrode 31R. Very little potential difference, usually less than 15 millivolts, will exist when the two electrodes are of the same material. A voltmeter which can be zeroed at this original potential value is desirable.

Following recording of the normal corroding potential, sufficient cathodic current is applied through electrode 31A and the solution to electrode 31C from battery pack 22, for example, to change the potential or polarize electrode 31C 10 millivolts, i.e. current sufficient to get a 10 millivolt drop between 31C and 31R as measured by the voltmeter 30, Approximately 10 minutes should be allowed for the reading to become stable. After polarization of electrode 31C becomes stable at 10 millivolts, the corrosion rate in mdd is read from the instrument 20, assuming the ammeter 24 is calibrated directly in mdd, or the reading from the ammeter 24 is read and correlated with the ($\Delta E/\Delta I$) or polarization weight loss curve. This is the rate at which electrode 31C is corroding at the time the reading is made. The procedure is repeated whenever knowledge of the corrosion rate is desired. The test probe may be left installed for long periods of time, if desired, and periodic measurements made to trace the corrosivity of the system.

In tests conducted with a probe constructed in accordance with the present invention, the steel test specimen C of the test probe described hereinabove, was accurately weighed before and after each test to obtain the actual corrosion rate from the weight loss. Each test was conducted for a period of one week. Several polarization measurements were made on the test specimen each day and the results time averaged for comparison with the weight loss. The polarization and weight loss data were then plotted on logarithmic scales as graphically shown in FIGURE 4. The line in FIGURE 4 is an average of all the data drawn to a slope of minus one. Most of the runs were conducted using triplicate test specimens. All tests were conducted at room temperature and the cathode was polarized 10 mv.

Table I lists the characteristics of each solution tested along with the corrosion rates obtained by weight loss and from the line in FIGURE 4. The range of salt concentrations shown was chosen as being representative of most oil field brines. An average of these results indicates that in the brine solutions tested, corrosion rates can be predicted within an average error of about 10 percent by means of polarization measurements.

TABLE I.—EXPERIMENTAL RESULTS

| Solutions tested | | Corrosion rates in mdd | | |
| --- | --- | --- | --- | --- |
| NaCl content, percent | Gas content | By weight loss | By polarization data | Percent error |
| 1 | Saturated w/air | 82.6 | 89.3 | 8.1 |
| 1 | do | 96.4 | 103.7 | 7.6 |
| 1 | do | 104.6 | 107.3 | 2.6 |
| 1 | do | 86.9 | 89.9 | 3.5 |
| 1 | do | 88.8 | 89.3 | 0.6 |
| 2 | do | 81.0 | 75.4 | 6.9 |
| 2 | do | 90.6 | 88.2 | 2.6 |
| 2 | do | 116.4 | 101.4 | 12.9 |
| 5 | do | 84.6 | 81.2 | 4.0 |
| 5 | do | 113.7 | 107.8 | 5.2 |
| 5 | do | 147.9 | 143.2 | 3.2 |
| 10 | do | 77.6 | 78.3 | 0.9 |
| 10 | do | 83.1 | 89.3 | 7.5 |
| 10 | do | 111.2 | 117.7 | 5.8 |
| 1 | Saturated w/nitrogen | 10.0 | 11.6 | 16.0 |
| 1 | do | 12.4 | 13.9 | 12.1 |
| 1 | do | 16.3 | 19.1 | 17.2 |
| 2 | do | 16.2 | 13.9 | 14.2 |
| 2 | do | 19.8 | 15.1 | 23.8 |
| 2 | do | 26.4 | 22.6 | 14.4 |
| 1 | Hydrogen sulfide added. | 108.2 | 134.0 | 23.9 |
| Average | | | | 9.2 |

The present invention represents several improvements over similar prior art instruments. Steel has heretofore not been considered a good reference electrode under ordinary circumstances because it polarizes easily if current flow through the voltage measuring device occurs. Also, its half-cell potential, while immersed in an electrolyte, varies over long periods of time. A good reference electrode should not polarize easily and have an essentially constant half-cell potential. However, it has been shown by the present invention that steel can be used as a reference in the polarization resistance technique of the present invention since the actual potential of the test specimen is of no particular importance in this process; only the potential change caused by the applied current is of interest. Also, each polarization measurement requires only about 10 minutes and steel serves as a stable reference for this short time. Furthermore, only small potential differences exist between the steel reference and the steel test specimen. By using a voltage measuring device with at least $10^6$ ohms input impedance, current flow through the potential measuring circuit is limited to approximately $10^8$ amps. This virtually eliminates any polarization of the steel reference electrode while measurements are being made. The small potential differences also allow a more sensitive voltmeter to be used in the measurements. The ability to use steel as a reference electrode permits construction of a simple, inexpensive field test probe.

Another feature of the present invention is that the apparatus can be permanently installed, i.e. for a long period of time, in a pipe line or vessel for determination of the corrosion rate of that line. A coating of corrosion products, e.g. rust, or corrosion of the electrodes, including the reference electrode, does not affect operation of the instrument since the reference electrode of the present invention changes in accordance with changes in the cathode. Furthermore, while the invention has been described with reference to oil field brines, the corrosion testing apparatus of the present invention also has application in other electrolytic systems such as refrigeration brine pipe, steam condensate lines, certain process industry and oil refinery units, etc.

The instrument of the present invention can be a completely portable, battery-operated unit designed for instantaneous measurement of corrosion rates in field and laboratory studies. The voltmeter used in the instrument package should be battery powered with at least $10^6$ ohms input impedance and capable of reading to 0.1 of a millivolt. The test probe is designed to withstand pressures up to about 1000 p.s.i. and temperatures up to about 300° F. although the maximum temperature may be increased through the use of insulation. In operation the electrode elements of the probe must be completely immersed in an electrolyte, e.g. oil brines, for the polarization equipment to perform properly. Measurements cannot be made in nonconductive materials, and if results with any degree of accuracy are to be obtained, the resistivity of the electrolyte should not exceed 50 ohm-cm. When dealing with solutions of higher resistance, a correction for the included IR drop should be made.

Although the invention has been described with reference to preferred embodiments thereof, using cathodic polarization, it is to be understood that the description is by way of illustration only and the invention may use anodic polarization by a reversal of the current flow. Accordingly, it is contemplated that modifications and variations can be made in the apparatus by those skilled in the art in light of my description without departing from the spirit of the invention.

What is claimed is:

1. An apparatus for rapidly determining the rate of corrosion of a metallic material by means of polarization measurements in an electrolytic solution which comprises test probe means including three electrodes consisting of a test specimen, a reference electrode and a third electrode, said test specimen and said reference electrode being substantially dimensionally identical and formed of said metallic material, said test probe means being adapted to be immersed in said electrolytic solution, means for passing a measurable amount of a polarizing current through said third electrode and said test specimen in an amount sufficient for polarizing said test specimen a predetermined amount including a source of direct current, a circuit connecting said third electrode and said test specimen to said direct current source, means arranged in said circuit across said source for accurately controlling the current supplied to said third electrode, a means in said circuit for measuring the current, and means arranged in an external circuit between the test specimen and said reference electrode for metering said predetermined amount of polarization of the test specimen with respect to said reference electrode.

2. An apparatus as defined in claim 1, wherein each of the two substantially identical metallic electrodes is a steel rod having an exposed surface area of approximately 9 square centimeters, and wherein said means for measuring the current is an ammeter calibrated in milligrams per square decimeter per day.

3. An apparatus as defined in claim 1, wherein said test probe means comprise a test probe body having a shouldered bore extending therethrough, an electrically insulating insert in said bore having an outer shoulder seating at the shoulder of said test probe body, said insert having three shouldered bores extending therethrough, an electrically conductive insert in each of said insulating insert bores having an outer shoulder seating against the shoulder of the respective insulating insert bores, said conductive insert having means at one end adapted for the attachment thereto of electrical leads, said third electrode, test specimen and reference electrode being formed by three dimensionally identical metal electrodes of the same metallic material each removably connected to the other end of a respective conductive insert.

4. An apparatus as defined in claim 3, wherein each of the three substantially dimensionally identical metallic electrodes is a steel rod having an exposed surface area of approximately 9 square centimeters.

5. An apparatus as defined in claim 1, wherein said third electrode is an anode and said test specimen a cathode.

6. A portable apparatus for rapidly and easily determining the rate of corrosion of a metallic material in an electrolytic solution by means of polarization measurements which comprises test probe means including three essentially dimensionally identical electrodes formed of said metallic material consisting of an anode, a cathode test specimen and a reference electrode, said test probe means being adapted to be immersed in said electrolytic solution, an instrument housing containing means for passing a measurable amount of a polarizing cathodic current through said anode and cathode in an amount sufficient for polarizing said cathode test specimen a predetermined amount including battery means, first circuit means for connecting said anode and said cathode to said battery means for passing current from said battery means through said anode, said electrolytic solution and said cathode, an external circuit separate from said first circuit means for connecting said cathode and said reference electrode, a voltage divider arranged in said first circuit means across said battery means for accurately controlling the current supplied to said anode, an ammeter in said first circuit means for measuring the current, switch means for controlling operation of said first circuit means, and a high impedance voltmeter adapted to be connected in said external circuit between the cathode and said reference electrode for measuring the polarization of said cathode with respect to said reference electrode.

7. An apparatus as defined in claim 6 wherein the impedance of said voltmeter is at least $10^6$ ohms.

8. An apparatus as defined in claim 6 wherein each of said electrodes is a steel rod having an exposed area of about 9 square centimeters and said ammeter is calibrated in milligrams per square decimeter per day.

9. An apparatus as defined in claim 6 wherein said first circuit means includes a pair of terminals adapted to be connected to a source of rectified AC current and further switch means for selectively passing current through said anode and cathode from said source of rectified AC current and said battery means.

10. An apparatus as defined in claim 9 wherein said further switch means and said switch means are a single switch.

11. A corrosion test probe assembly suitable for determining the rate of corrosion of a metallic material by means of polarization measurements comprising a test probe body having a shouldered bore extending therethrough, an electrically insulating insert in said bore having an outer shoulder seating at the shoulder of said test probe body, said insert having three shouldered bores extending therethrough, an electrically conductive insert for each of said insulating insert bores having an outer shoulder seating against the shoulder of the respective insulating insert bores, said conductive insert having means at one end adapted for the attachment thereto of electrical leads, and three essentially dimensionally identical metallic electrodes each removably connected to the other end of a respective conductive insert, at least two of said metallic electrodes being of the same material.

12. A corrosion test probe assembly as defined in claim 11, wherein each of said electrodes is a steel rod having an exposed surface area of approximately 9 square centimeters.

13. A corrosion test probe assembly as defined in claim 11, wherein each of said shoulders faces the inner end of said test probe body and further including a face of plastic material in the bottom of said shouldered bore extending through said test probe body for sealing the end thereof.

14. A corrosion test probe assembly suitable for determining the rate of corrosion of a non-precious metallic material in a corrodant by means of polarization measurements comprising a test probe body, separate essentially dimensionally identical electrodes of said metallic material for a measurement, consisting of a test specimen supported from said body, a bared reference electrode supported from said body, and a third electrode supported from said body, separate electrically conductive means extending through said probe body and connected, respectively, to said test specimen, said reference electrode and said third electrode, said electrically conductive means forming a potential measuring circuit through said test specimen, said reference electrode and said corrodant, and means insulating said electrically conductive means from each other.

15. A corrosion test probe assembly as defined in claim 14, where each said electrode is a steel rod having an exposed surface area of about 9 square centimeters.

16. A process for rapidly determining the rate of corrosion of a metallic material in an electrolytic solution by means of polarization measurements comprising immersing three essentially dimensionally identical electrodes formed of said metallic material in said solution, one electrode being an anode and another electrode being a cathode with the third electrode being a reference electrode arranged adjacent at least one of said anode and said cathode, said electrodes having a predetermined exposed surface area, passing a measurable amount of direct current through a circuit including said anode, said solution and said cathode in an amount sufficient to effect a predetermined measurable polarization of said one of said anode and said cathode with respect to said reference electrode, detecting electrically the current density with respect to corrosion rate weight loss of the electrode required to obtain said predetermined polarization of said one of said cathode and said anode with respect to the reference electrode to produce a composite corrosion rate-polarization resistance curve whereby the corrosion rate of an electrode of said metal in contact with an electrolytic environment similar to the said electrolytic solution can be correlated with aspects of the curve and determined by electrically measuring the current density required for an electrode of said metal and said predetermined surface area to obtain said predetermined polarization when immersed in said electrolytic environment.

17. A process as defined in claim 16 wherein said predetermined amount which the cathode is polarized is about 10 millivolts.

18. A process as defined in claim 16 wherein each of said electrodes is a steel electrode.

19. A process for rapidly determining the rate of corrosion of steel in an electrolytic solution by means of polarization measurements comprising immersing three essentially dimensionally identical electrodes in said solution, one electrode being an anode and the other two comprising a steel cathode test specimen and a steel reference electrode arranged adjacent said cathode, passing a measurable amount of direct current through said solution from said anode to said cathode test specimen in an amount sufficient to effect a predetermined measurable polarization of said cathode test specimen with respect to said reference electrode through a circuit containing said anode and said cathode test specimen, detecting electrically the current density with respect to corrosion rate weight loss of the cathode test specimen required to obtain said predetermined polarization of the cathode test specimen with respect to the reference electrode to produce a composite corrosion rate-polarization resistance curve whereby the corrosion rate of steel in contact with an electrolytic environment substantially similar to the said electrolytic solution can be correlated with aspects of the curve and determined by electrically measuring the current density required for a similar cathode test specimen to obtain said predetermined polarization when immersed in said electrolytic environment.

20. A process for rapidly determining the rate of corrosion of a steel in an oil field brine by means of polarization measurements comprising immersing three essentially dimensionally identical steel electrodes each having an exposed surface area of about 9 square centimeters in the brine to be tested, one electrode being an anode and another electrode being a cathode test specimen with the third electrode being a reference electrode arranged adjacent said cathode test specimen, passing a measurable amount of direct current through a circuit containing said anode, said solution and said steel cathode test specimen from said steel anode to said steel cathode in an amount sufficient to effect a polarization of said steel cathode with respect to said reference electrode of approximately 10 millivolts, detecting electrically the current density required to obtain said polarization of the cathode with respect to the reference electrode and the corrosion rate of steel, each microamp of external current required to obtain said polarization representing a corrosion rate of steel in said brine of one milligram per square decimeter per day.

References Cited
UNITED STATES PATENTS 3,098,801  7/1963  Marsh et al. _____ 204—1.1

JOHN H. MACK, *Primary Examiner.*

T. H. TUNG, *Assistant Examiner.*

UNITED STATES PATENT OFFICE
CERTIFICATE OF CORRECTION

Patent No. 3,406,101                                                              October 15, 19

James M. Kilpatrick

It is certified that error appears in the above identified patent and that said Letters Patent are hereby corrected as shown below:

Column 12, line 27, cancel "3,098,801   7/1963   Marsh et al ------- 204-1.1" and insert the following references:

| | | | |
|---|---|---|---|
| 2,851,654 | 9/1958 | Haddad --------------- | 204-195 |
| 2,856,495 | 10/1958 | Chittum et al. ------ | 324-71C |
| 2,947,679 | 8/1960 | Schaschl et al. ----- | 204-195 |
| 3,098,801 | 7/1963 | Marsh et al. -------- | 204-1.1 |
| 3,133,873 | 5/1964 | Miller et al. ------- | 204-286 |
| 3,242,729 | 3/1966 | Keller --------------- | 204-195 |
| 3,250,689 | 5/1966 | Seyl ---------------- | 204-1.1 |

OTHER REFERENCES

Blum et al., "Trans. of the Am. Electrochemical Soc.", 1927, Volume L11, 419-429. Stern, "Corrosion", 1958, volume 14, pages 440t-444t.

Signed and sealed this 17th day of March 1970.

(SEAL)
Attest:

EDWARD M. FLETCHER, JR.                              WILLIAM E. SCHUYLER, JR
Attesting Officer                                                   Commissioner of Patents